(12) United States Patent
Yang et al.

(10) Patent No.: US 12,179,300 B2
(45) Date of Patent: Dec. 31, 2024

(54) PROTECTIVE SHROUD AND MACHINE

(71) Applicants: Tyco Electronics (Shanghai) Co., Ltd., Shanghai (CN); Kunshan League Automechanism Co., Ltd, Kunshan (CN); TE Connectivity Services GmbH, Schaffhausen (CH)

(72) Inventors: An (Joshua) Yang, Shanghai (CN); Lvhai (Samuel) Hu, Shanghai (CN); Roberto Francisco-Yi Lu, Bellevue, WA (US); Yuting He, Kunshan (CN)

(73) Assignees: TE Connectivity Solutions GmbH, Schaffhausen (CH); Tyco Electronics (Shanghai) Co., Ltd., Shanghai (CN); Kunshan League Automechanism Co., Ltd., Kunshan (CN)

( * ) Notice: Subject to any disclaimer, the term of this patent is extended or adjusted under 35 U.S.C. 154(b) by 167 days.

(21) Appl. No.: 17/955,889

(22) Filed: Sep. 29, 2022

(65) Prior Publication Data
US 2023/0100250 A1 Mar. 30, 2023

(30) Foreign Application Priority Data
Sep. 29, 2021 (CN) .......................... 202111155121.X

(51) Int. Cl.
*E06B 3/44* (2006.01)
*B23Q 11/00* (2006.01)
*B23Q 11/08* (2006.01)
*E05F 1/10* (2006.01)

(52) U.S. Cl.
CPC ...... *B23Q 11/0089* (2013.01); *B23Q 11/0891* (2013.01); *E05F 1/1091* (2013.01); *E05Y 2999/00* (2024.05)

(58) Field of Classification Search
None
See application file for complete search history.

(56) References Cited

U.S. PATENT DOCUMENTS

| 4,134,234 A * | 1/1979 | Wood ................. E05D 13/1207 49/429 |
| 5,365,636 A * | 11/1994 | Jensen ..................... E05F 1/16 16/72 |
| 5,537,717 A * | 7/1996 | Carey ....................... F16P 1/02 19/107 |
| 11,713,606 B2 * | 8/2023 | Kicher .................... E05D 13/12 49/200 |
| 11,920,401 B2 * | 3/2024 | Shaaban ................... E05F 1/16 |
| 2003/0079448 A1 * | 5/2003 | How ...................... B01D 46/10 55/385.2 |

(Continued)

FOREIGN PATENT DOCUMENTS

| CN | 112796611 A * | 5/2021 | ............. B61B 1/02 |
| CN | 105909096 B * | 2/2023 | ............. E05C 17/56 |

(Continued)

*Primary Examiner* — Joseph A Dillon, Jr.
(74) *Attorney, Agent, or Firm* — Barley Snyder

(57) ABSTRACT

A protective shroud includes a shroud body, a protective door movably installed on the shroud body, and a buffer mechanism connected between the shroud body and the protective door. The buffer mechanism slows down a moving speed of the protective door. The protective door is moved between an open position and a closed position in a vertical direction to open or close the shroud body.

20 Claims, 9 Drawing Sheets

(56) References Cited

U.S. PATENT DOCUMENTS

| | | | | |
|---|---|---|---|---|
| 2006/0284017 | A1* | 12/2006 | Saint-Jalmes | B64C 1/1415 |
| | | | | 244/129.5 |
| 2013/0230200 | A1* | 9/2013 | Lau | H04R 1/02 |
| | | | | 381/332 |
| 2015/0108307 | A1* | 4/2015 | Simon | F16M 11/2014 |
| | | | | 248/231.91 |
| 2020/0157868 | A1* | 5/2020 | Terno | E05F 5/003 |
| 2021/0180382 | A1* | 6/2021 | Wei | E05F 5/10 |
| 2021/0181218 | A1* | 6/2021 | Gisler | G01N 35/00594 |
| 2021/0310292 | A1* | 10/2021 | Tasche | E05D 15/16 |
| 2023/0288441 | A1* | 9/2023 | Gao | C12M 41/48 |

FOREIGN PATENT DOCUMENTS

| | | | | | |
|---|---|---|---|---|---|
| CN | 115874900 | A | * | 3/2023 | ......... B23Q 11/0089 |
| DE | 102022124779 | A1 | * | 3/2023 | ......... B23Q 11/0089 |
| EP | 0556632 | B1 | * | 3/1993 | |

* cited by examiner

PROTECTIVE SHROUD AND MACHINE

CROSS-REFERENCE TO RELATED APPLICATION

This application claims the benefit of the filing date under 35 U.S.C. § 119(a)-(d) of Chinese Patent Application No. 202111155121.X, filed on Sep. 29, 2021.

FIELD OF THE INVENTION

The present invention relates to a protective shroud and a machine including the protective shroud.

BACKGROUND

Machines commonly have various electric devices or moving parts. These electric devices or moving parts may cause danger to workers during work. For example, a worker's clothes or hair can be wrapped around the rotating cutter head of the machine. For safety, the machine is usually equipped with a protective shroud, in which various electric devices or moving parts are contained.

In order to facilitate access to the protective shroud, a protective door needs to be set on the protective shroud to open or close the protective shroud. However, the existing protective door can only be moved left and right along the horizontal direction. As a result, due to space constraints in the horizontal direction, the protective cover cannot be fully opened, affecting operator access.

SUMMARY

A protective shroud includes a shroud body, a protective door movably installed on the shroud body, and a buffer mechanism connected between the shroud body and the protective door. The buffer mechanism slows down a moving speed of the protective door. The protective door is moved between an open position and a closed position in a vertical direction to open or close the shroud body.

BRIEF DESCRIPTION OF THE DRAWINGS

The features of the present invention will become more apparent by describing in detail exemplary embodiments thereof with reference to the accompanying drawings, in which.

DETAILED DESCRIPTION OF THE EMBODIMENTS

Figure 1:
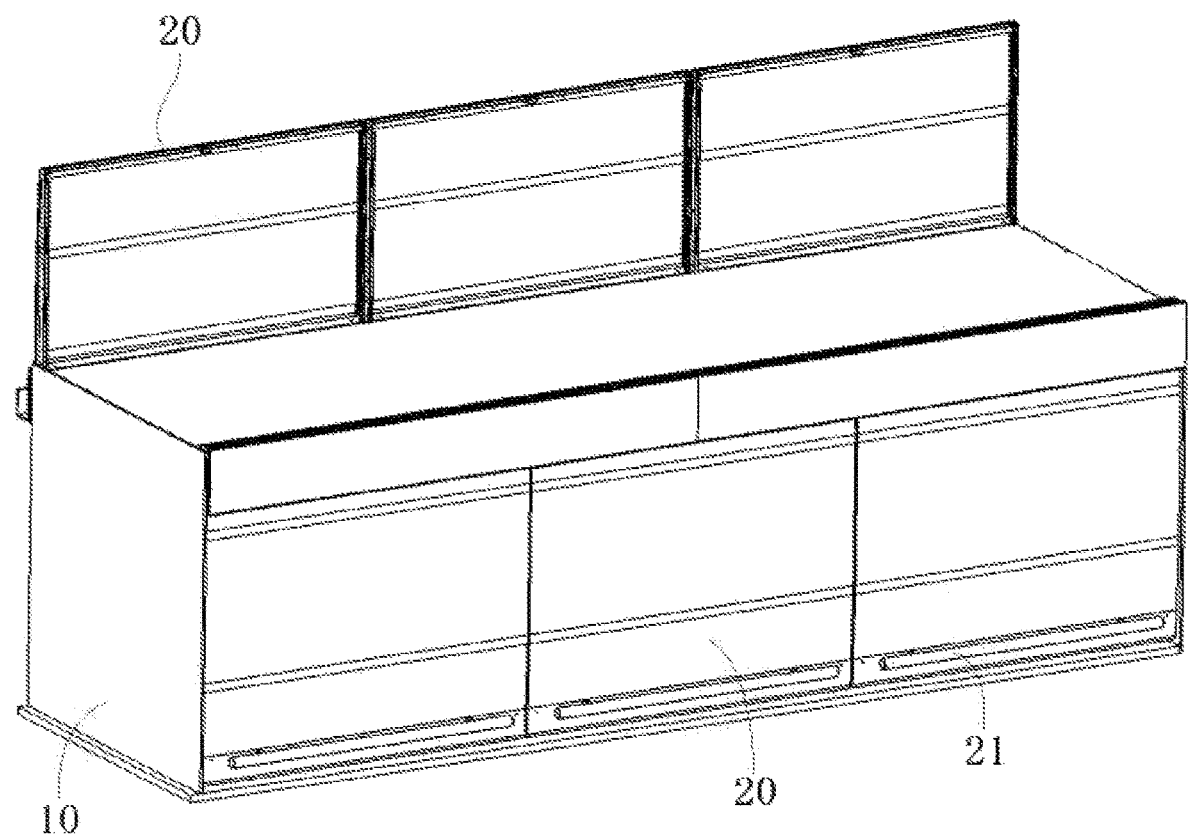
FIG. 1 is a perspective view of a protective shroud according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
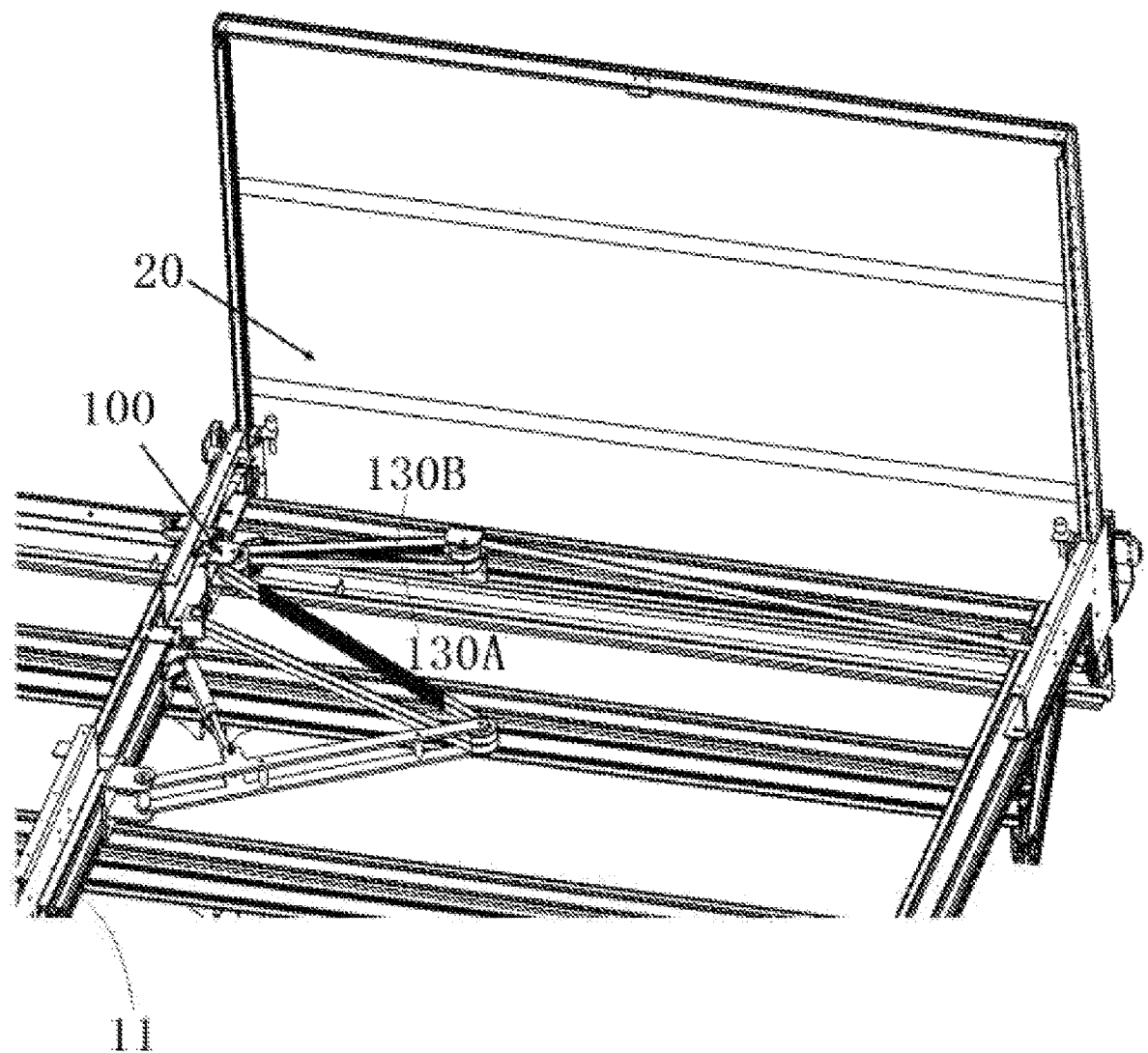
FIG. 2 is a perspective view of a protective door and a buffer mechanism of the protective shroud according to an embodiment.

FIG. 1 shows an illustrative perspective view of a protective shroud according to an exemplary embodiment of the present invention. FIG. 2 shows an illustrative perspective view of the protective door 20 and buffer mechanism 100 of the protective shroud according to an exemplary embodiment of the present invention.

As shown in FIG. 1 and FIG. 2, in the illustrated embodiment, the protective shroud mainly includes a shroud body (or shell) 10, a protective door 20 and a buffer mechanism 100. The protective door 20 is movably mounted on the shroud body 10. The buffer mechanism 100 is connected between the shroud body 10 and the protective door 20 to slow down the moving speed of the protective door 20. The protective door 20 can be moved vertically between an open position and a closed position relative to the shroud body 10 to open or close the shroud body 10. In an exemplary embodiment of the present invention, the protective door 20 can be slidably installed on the shroud body 10 through a slide rail, so that the protective door 20 can slide up and down in the vertical direction relative to the shroud body 10. The protective shroud can be fully opened, and it is very convenient for operators to enter and exit the protective shroud.

Figure 3:
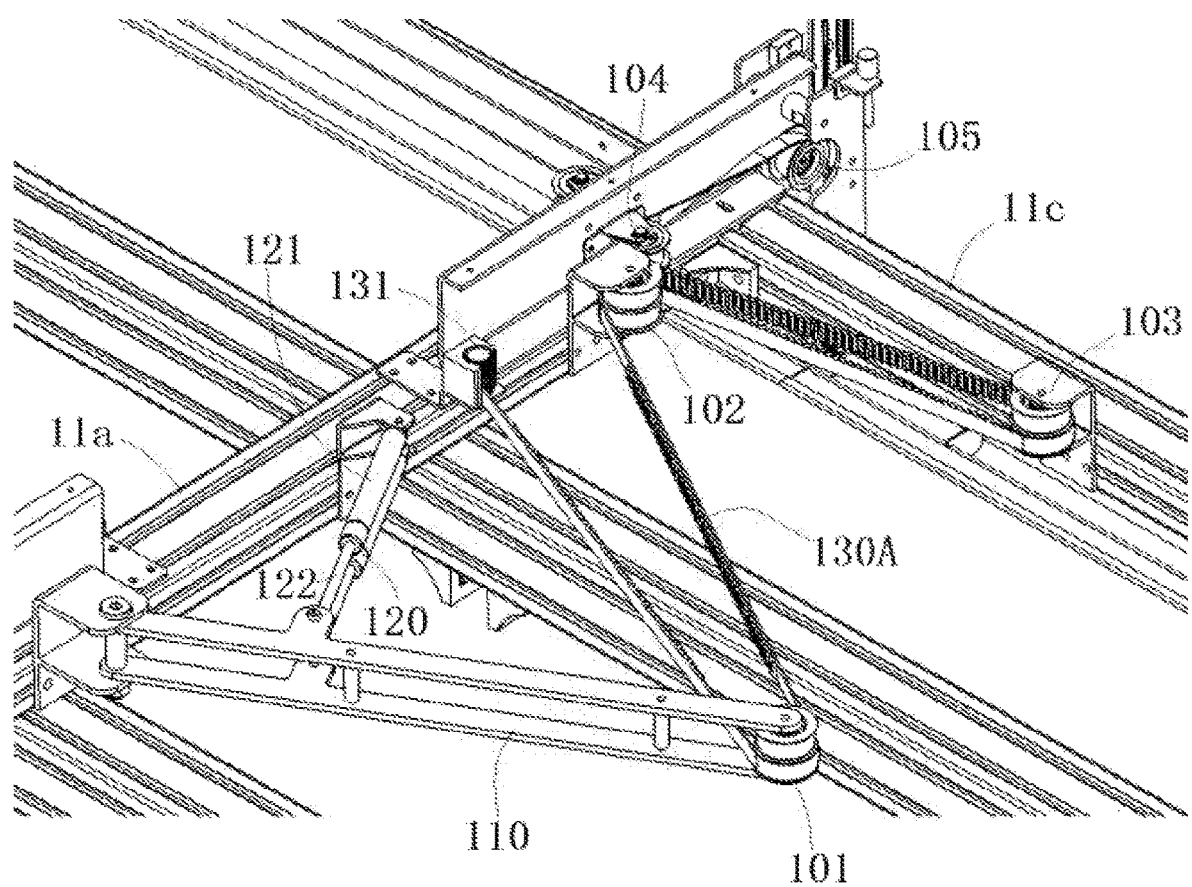
FIG. 3 is an enlarged perspective view of the buffer mechanism of FIG. 2, showing a first connection belt.
Figure 5:
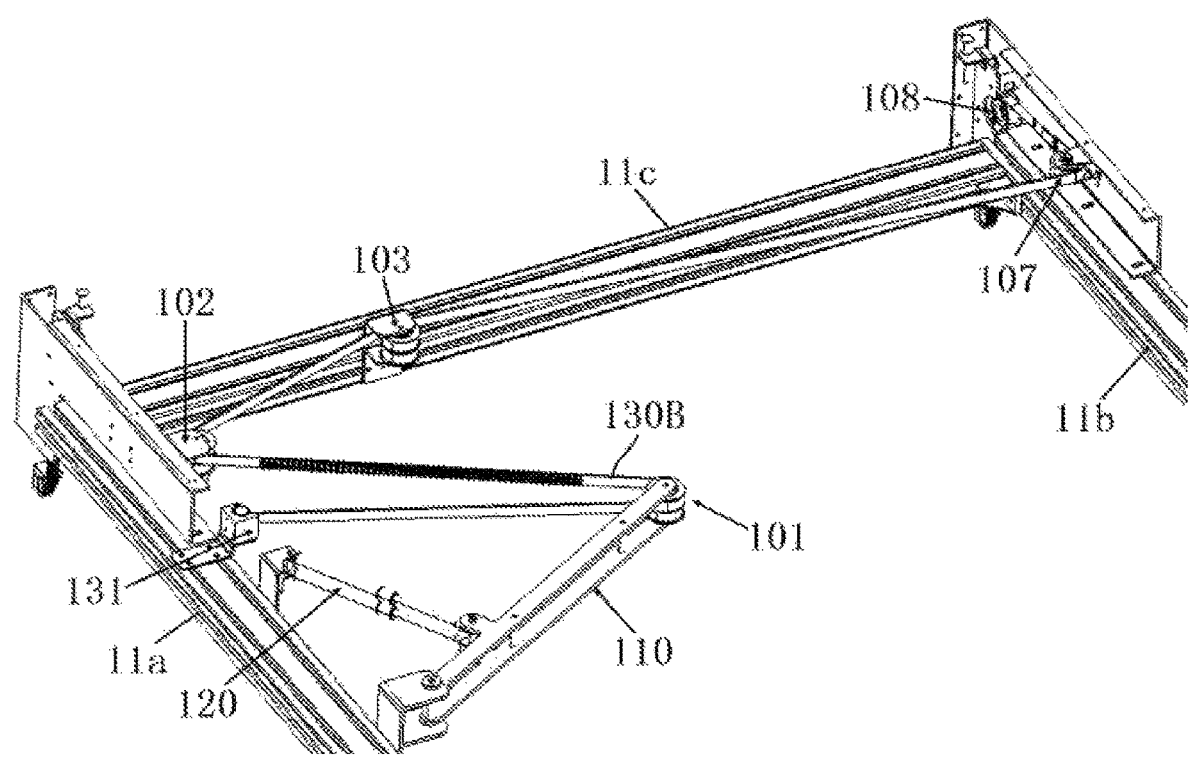
FIG. 5 is a partially enlarged view of the buffer mechanism of FIG. 2, showing a second connection belt.

FIG. 3 shows a partially enlarged view of the buffer mechanism 100 shown in FIG. 2, in which only the first connection belt 130A is shown. FIG. 5 shows a partially enlarged view of the buffer mechanism 100 shown in FIG. 2, in which only the second connection belt 130B is shown.

As shown in FIGS. 1-3 and 5, in the illustrated embodiment, the buffer mechanism 100 includes a connection rod 110, an air spring 120, a first roller 101, a first connection belt 130A, and a second connection belt 130B. One end of the connection rod 110 is rotationally connected to the shroud body 10. The gas spring 120 includes a cylinder block 121 and a piston rod 122. The first roller 101 is mounted on the other end of the connection rod 110 and can rotate freely. The two ends of the connection belt 130A and 130B are respectively connected to the shroud body 10 and the protective door 20.

As shown in FIGS. 1-3 and 5, in the illustrated embodiment, an end of the cylinder block 121 is rotationally connected to the shroud body 10, an end of the piston rod 122 is rotationally connected to a location between the two ends of the connection rod 110, and the connection belt 130A and 130B passes through the first roller 101.

Figure 4:
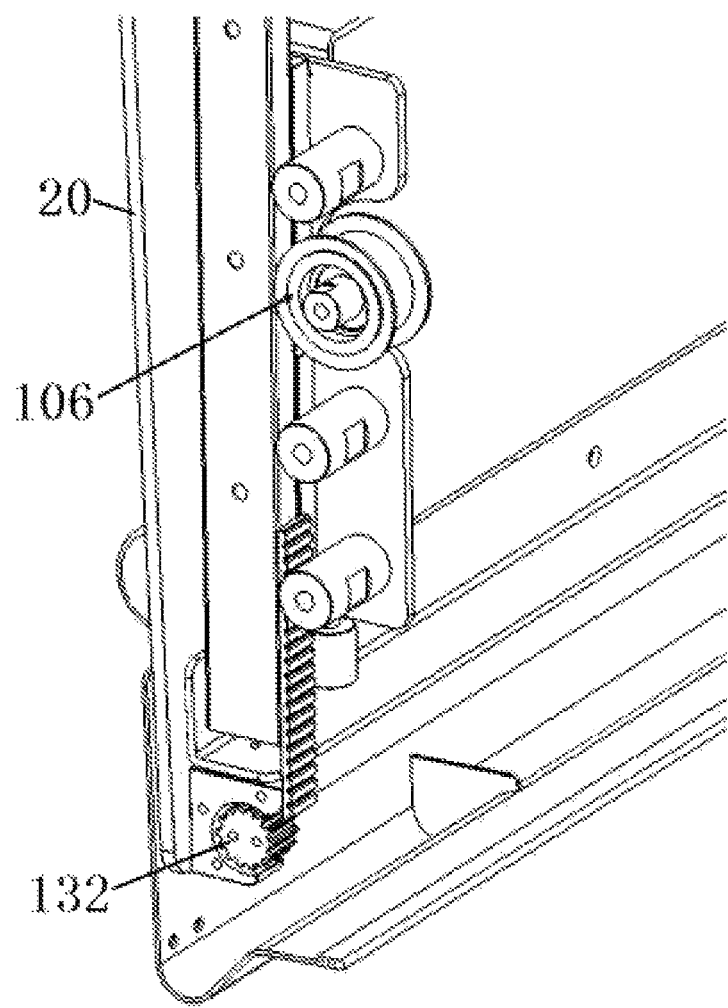
FIG. 4 is a partially enlarged view of a side of the protective door of FIG. 2.
Figure 6:
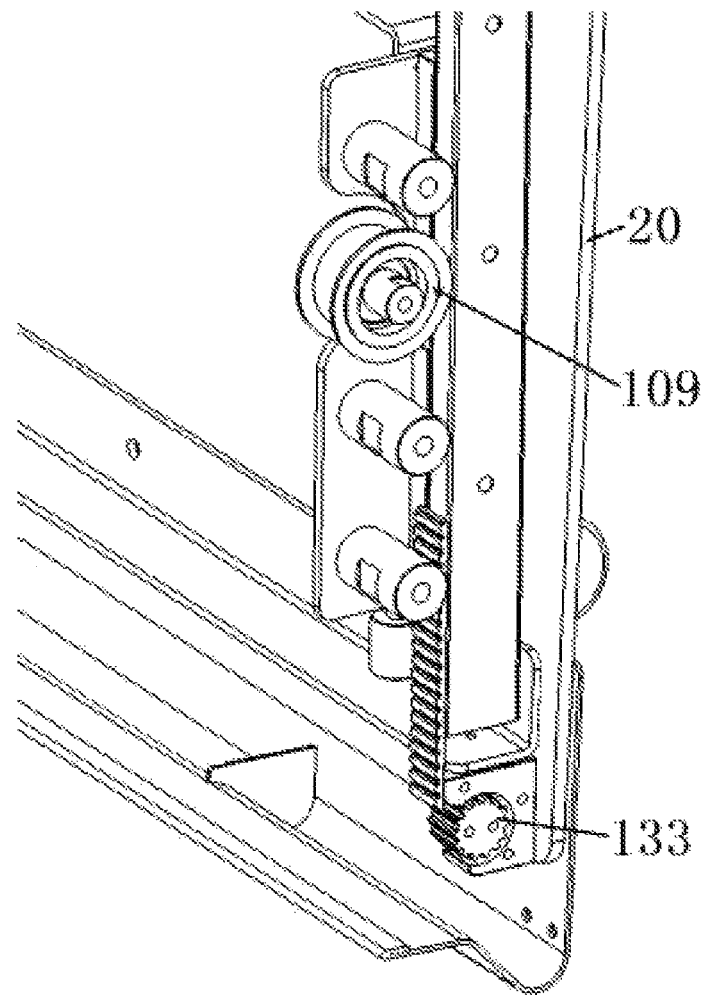
FIG. 6 is a partially enlarged view of another side of the protective door of FIG. 2.

FIG. 4 shows a partially enlarged view of one side of the protective door 20 shown in FIG. 2. FIG. 6 shows a partially enlarged view of the other side of the protective door 20 shown in FIG. 2.

As shown in FIGS. 1 to 6, in the illustrated embodiment, the connection belt 130A and 130B includes a first connection belt 130A and a second connection belt 130B arranged adjacent to each other. A first end of each of the first connection belt 130A and the second connection belt 130B are connected to the same position on the shroud body 10, and a second end of each of the first connection belt 130A and the second connection belt 130B are respectively connected to both sides in the width direction of the protective door 20.

As shown in FIGS. 1 to 6, in the illustrated embodiment, the buffer mechanism 100 also includes a second roller 102 and a third roller 103. The second roller 102 is mounted on the shroud body 10 and can rotate freely. The third roller 103 is mounted on the shroud body 10 and can rotate freely. The connection belt 130A and 130B passes through the second roller 102 and the third roller 103.

As shown in FIGS. 1 to 6, in the illustrated embodiment, the buffer mechanism 100 also includes a fourth roller 104, a fifth roller 105, and a sixth roller 106. The fourth roller 104 is mounted on the shroud body 10 and can rotate freely. The fifth roller 105 is mounted on the shroud body 10 and can rotate freely. The sixth roller 106 is mounted on the protective door 20 and can rotate freely. The first connection belt 130A passes through the fourth roller 104, the fifth roller 105 and the sixth roller 106.

As shown in FIGS. 1 to 6, in the illustrated embodiment, the buffer mechanism 100 also includes a seventh roller 107, an eighth roller 108, and a ninth roller 109. The seventh roller 107 is mounted on the shroud body 10 and can rotate freely. The eighth roller 108 is mounted on the shroud body 10 and can rotate freely. The ninth roller 109 is mounted on the protective door 20 and can rotate freely. The second connection belt 130B passes through the seventh roller 107, the eighth roller 108 and the ninth roller 109.

As shown in FIGS. 1 to 6, in the illustrated embodiment, the first roller 101, the second roller 102, the third roller 103, the fourth roller 104, the fifth roller 105, the seventh roller 107 and the eighth roller 108 are installed at different positions on the shroud body 10 respectively. The sixth roller 106 and the ninth roller 109 are respectively installed on both sides in the width direction of the protective door 20.

As shown in FIGS. 1 to 6, in the illustrated embodiment, the rotation axes of the first roller 101, the second roller 102, the third roller 103, the fourth roller 101 and the seventh roller 107 extend along the height direction of the protective door 20. The rotation axes of the fifth roller 105, the sixth roller 106, the eighth roller 108 and the ninth roller 109 extend along the width direction of the protective door 20.

As shown in FIGS. 1 to 6, in the illustrated embodiment, the buffer mechanism 100 also includes a first connection piece 131, a second connection piece 132, and a third connection piece 133. The first connection piece 131 is used to connect one ends of the first connection belt 130A and the second connection belt 130B to the shroud body 10 at the same time. The second connection piece 132 is used to connect the other end of the first connection belt 130A to one side in the width direction of the shroud body 10. The third connection piece 133 is used to connect the other end of the second connection belt 130B to the other side in the width direction of the shroud body 10.

As shown in FIGS. 1 to 6, in the illustrated embodiment, the shroud body 10 includes a top frame 11. The top frame 11 includes two first frames 11a, 11b perpendicular to the protective door 20 and a second frame 11c parallel to the protective door 20. The connection rod 110, the gas spring 120, the first connection piece 131, the second roller 102, the fourth roller 101 and the fifth roller 105 are connected or mounted to one first frame 11a. The seventh roller 107 and the eighth roller 108 are mounted on the other first frame 11b which is distanced from the one first frame 11a by a predetermined distance. The third roller 103 is mounted on the second frame 11c at a position between one first frame 11a and the other first frame 11b.

As shown in FIGS. 1 to 6, in the illustrated embodiment, the second connection piece 132 and the third connection piece 133 are arranged at the lower end of the protective door 20, and the sixth roller 106 and the ninth roller 109 are located above the second connection piece 132 and the third connection piece 133, respectively.

As shown in FIGS. 1 to 6, in the illustrated embodiment, a handle 21 is arranged on the outside of the protective door 20, so that the protective door 20 can be opened or closed by operating the handle 21.

As shown in FIGS. 1 to 6, in the illustrated embodiment, at least one of the first connection belt 130A and the second connection belt 130B is a toothed belt.

As shown in FIGS. 1 to 6, in the illustrated embodiment, the protective door 20 can be moved upward to the open position relative to the shroud body 10 and can be moved downward to the closed position relative to the shroud body 10.

Figure 7:
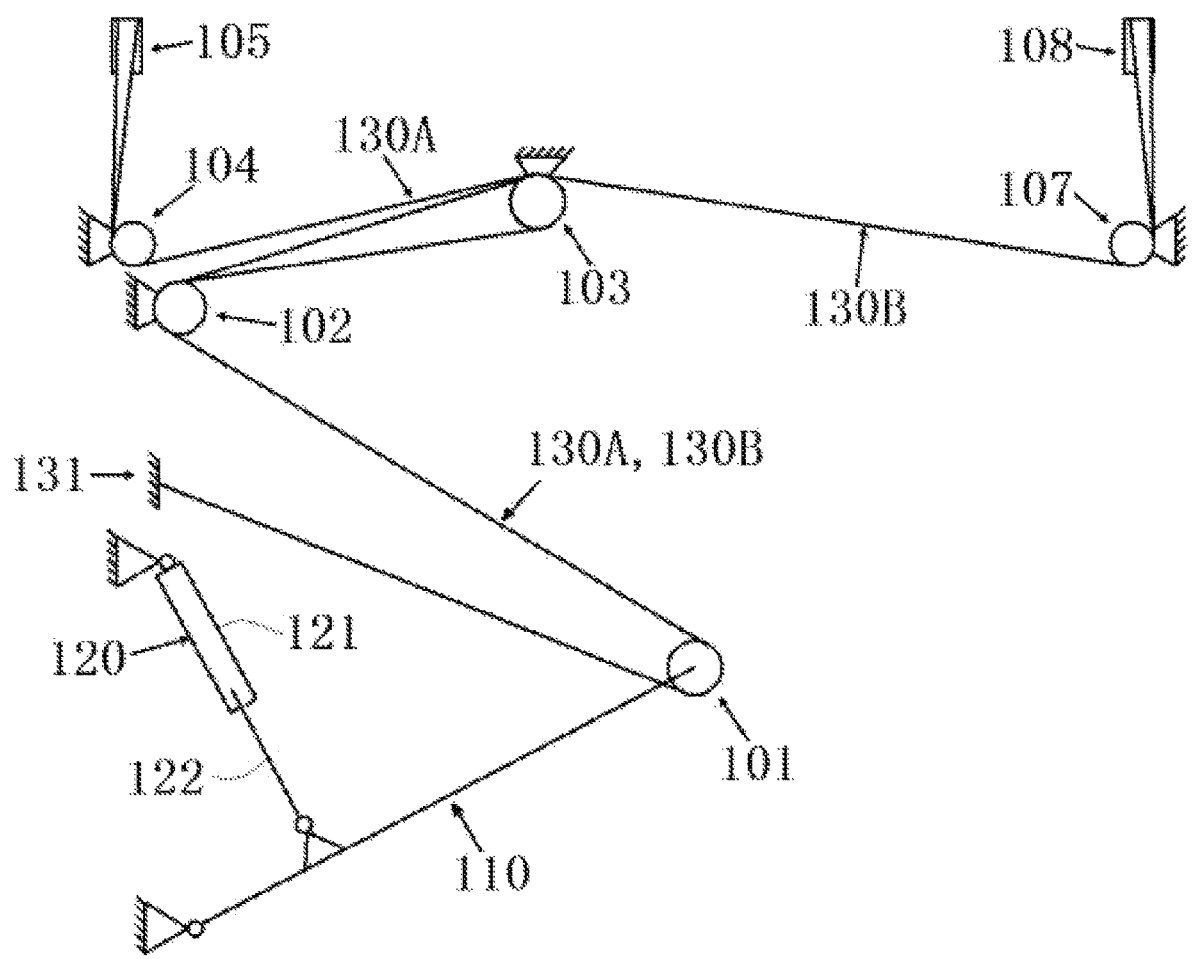
FIG. 7 is a schematic diagram of the buffer mechanism of FIG. 2, with the protective door in an open position.
Figure 8:
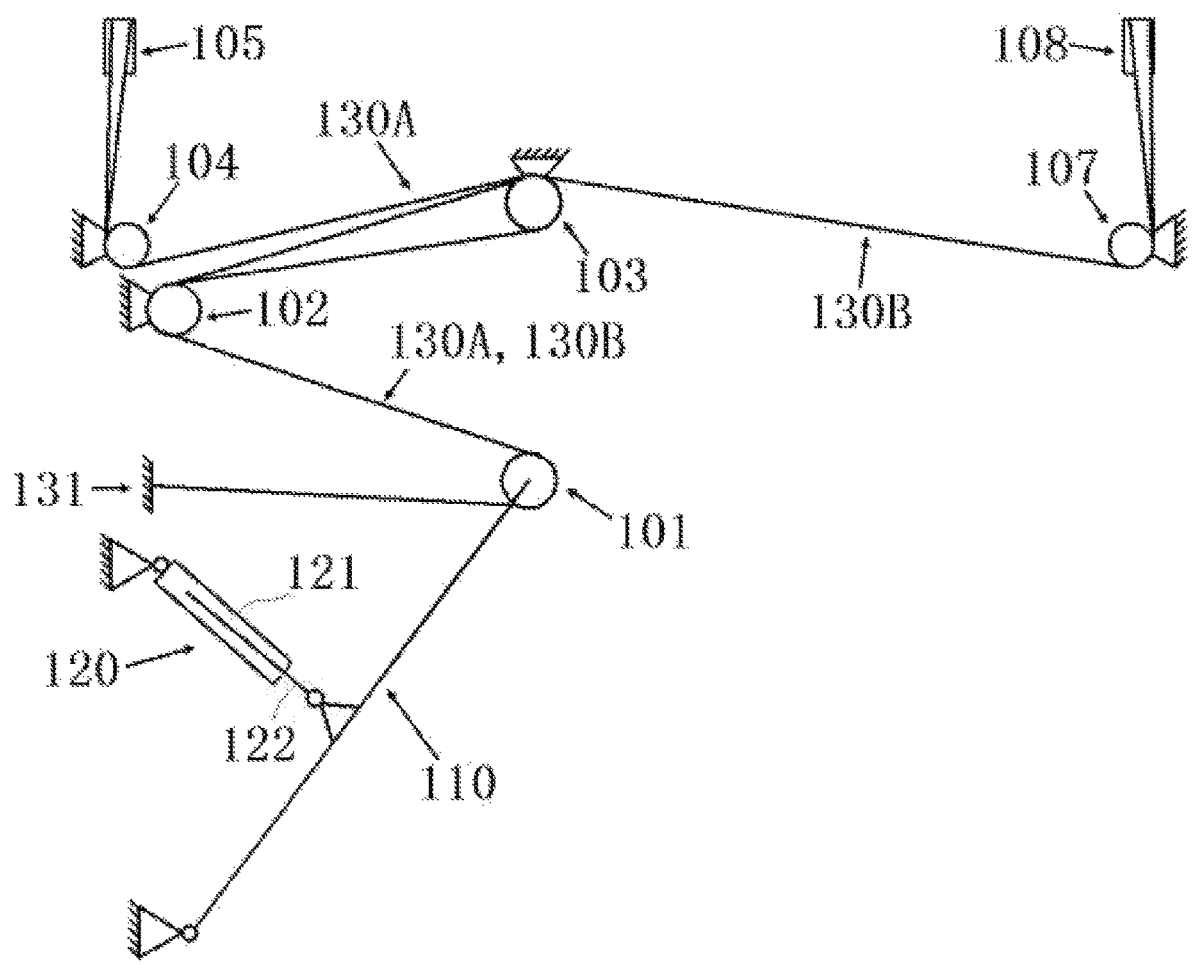
FIG. 8 is a schematic diagram of the buffer mechanism of FIG. 2, with the protective in a closed position.

FIG. 7 shows an illustrative view of the buffer mechanism 100 shown in FIG. 2, in which the protective door 20 is in the open position. FIG. 8 shows an illustrative view of the buffer mechanism 100 shown in FIG. 2, in which the protective door 20 is in the closed position.

As shown in FIG. 7, in the illustrated embodiment, during the upward opening of the protective door 20, the piston rod 122 of the gas spring 120 gradually extends outward to drive the connection rod 110 to rotate away from the gas spring 120.

As shown in FIG. 8, in the illustrated embodiment, in the process of closing the protective door 20 downward, the connection belt 130A and 130B pull the connection rod 110 to rotate toward the gas spring 120, so as to drive the piston rod 122 of the gas spring 120 to gradually retract inward.

In an exemplary embodiment of the present invention, a machine is also disclosed, which includes the aforementioned protective shroud and an electric device or moving part. The electric device or moving parts are contained in the protective shroud. In this way, workers will not touch the electric device or moving parts during the operation of machine, which can ensure the safety of workers.

Figure 9:
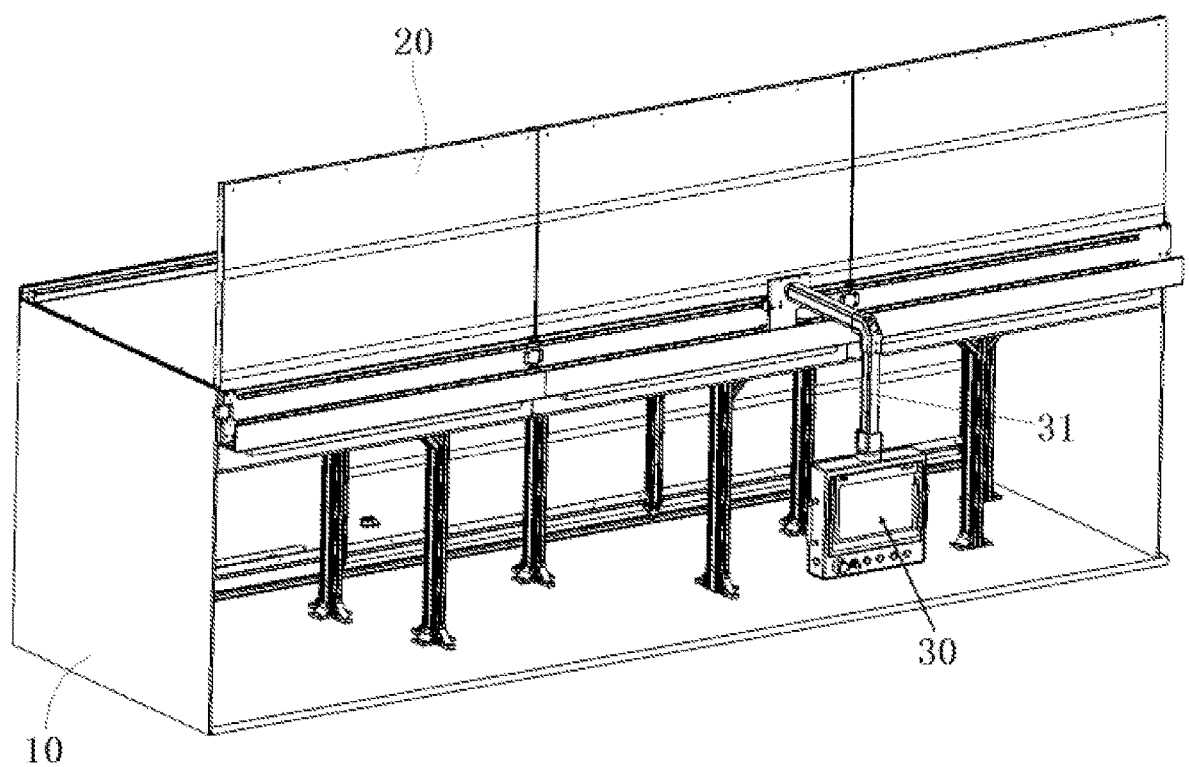
FIG. 9 is a perspective view of the protective shroud according to an embodiment with a human-computer interaction device.

FIG. 9 shows an illustrative perspective view of a protective shroud according to an exemplary embodiment of the present invention, in which a human-computer interaction device 30 is shown. As shown in FIG. 9, in the illustrated embodiment, the machine also includes a human-computer interaction device 30, which is slidably connected to the top of the front side of the shroud body 10 of the protective shroud. The human-computer interaction device 30 can be moved left and right along the width direction of the protective door 20 of the protective shroud, so that it can be moved to a position that does not interfere with the operator's access to the protective shroud.

As shown in FIG. 9, in the illustrated embodiment, the human-computer interaction device 30 includes an L-shaped connection arm 31, one end of which is slidably connected to the top of the front side of the shroud body 10 of the protective shroud. The human-computer interaction device 30 is suspended in front of the protective door 20 so as not to interfere with the opening or closing of the protective door 20.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A protective shroud, comprising:
   a shroud body;
   a protective door movably installed on the shroud body; and
   a buffer mechanism connected between the shroud body and the protective door, the buffer mechanism slowing down a moving speed of the protective door, the protective door is moved between an open position and a closed position in a vertical direction to open or close the shroud body, the buffer mechanism includes a connection rod and a connection belt, an end of the connection rod is rotationally connected to the shroud body, a pair of ends of the connection belt are respectively connected to the shroud body and the protective door.

2. The protective shroud of claim 1, wherein the buffer mechanism includes:
   a gas spring including a cylinder block and a piston rod; and
   a first roller rotationally installed on another end of the connection rod.

3. The protective shroud of claim 2, wherein an end of the cylinder block is rotationally connected to the shroud body, an end of the piston rod is rotationally connected to a location between the ends of the connection rod, and the connection belt passes through the first roller.

4. The protective shroud of claim 3, wherein the connection belt includes a first connection belt and a second connection belt which are arranged adjacent to one another, a first end of each of the first connection belt and the second connection belt are connected to a same position on the shroud body, and a second end of each of the first connection belt and the second connection belt are respectively connected to a pair of sides in a width direction of the protective door.

5. The protective shroud of claim 4, wherein the buffer mechanism includes a second roller rotationally mounted on the shroud body and a third roller rotationally installed on the shroud body, the connection belt passes through the second roller and the third roller.

6. The protective shroud of claim 5, wherein the buffer mechanism includes a fourth roller rotationally mounted on the shroud body, a fifth roller rotationally mounted on the shroud body, and a sixth roller rotationally installed on the protective door, the first connection belt passes through the fourth roller, the fifth roller and the sixth roller.

7. The protective shroud of claim 6, wherein the buffer mechanism includes a seventh roller rotationally mounted on the shroud body, an eighth roller rotationally mounted on the shroud body, and a ninth roller rotationally installed on the protective door, the second connection belt passes through the seventh roller, the eighth roller and the ninth roller.

8. The protective shroud of claim 7, wherein the first roller, the second roller, the third roller, the fourth roller, the fifth roller, the seventh roller, and the eighth roller are respectively installed at different positions on the shroud body, the sixth roller and the ninth roller are respectively installed on the sides in the width direction of the protective door.

9. The protective shroud of claim 8, wherein a rotation axis of the first roller, the second roller, the third roller, the fourth roller, and the seventh roller extend along a height direction of the protective door, a rotation axis of the fifth roller, the sixth roller, the eighth roller, and the ninth roller extend along the width direction of the protective door.

10. The protective shroud of claim 8, wherein the buffer mechanism includes:
    a first connection piece for simultaneously connecting the first ends of the first connection belt and the second connection belt to the shroud body;
    a second connection piece for connecting the second end of the first connection belt to one side in the width direction of the shroud body; and
    a third connection piece for connecting the second end of the second connection belt to the other side in the width direction of the shroud body.

11. The protective shroud of claim 10, wherein the shroud body includes a top frame, which has two first frames perpendicular to the protective door and a second frame parallel to the protective door.

12. The protective shroud of claim 11, wherein the connection rod, the gas spring, the first connection piece, the second roller, the fourth roller, and the fifth roller are connected or installed on one of the first frames, the seventh roller and the eighth roller are mounted on the other of the first frames which is distanced from the one of the first frames by a predetermined distance, the third roller is mounted on the second frame and located at a position between the two first frames.

13. The protective shroud of claim 12, wherein the second connection piece and the third connection piece are arranged at a lower end of the protective door, the sixth roller and the ninth roller are respectively located above the second connection piece and the third connection piece.

14. The protective shroud of claim 1, wherein a handle is arranged on an outside of the protective door, the protective door is capable of being opened or closed by operating the handle.

15. The protective shroud of claim 4, wherein at least one of the first connection belt and the second connection belt is a toothed belt.

16. The protective shroud of claim 2, wherein the protective door is capable of being moved upward to the open position relative to the shroud body and is capable of being moved downward to the closed position relative to the shroud body.

17. The protective shroud of claim 15, wherein, in the process of opening the protective door upward, the piston rod of the gas spring gradually extends outward to drive the connection rod to rotate away from the gas spring, and in the process of closing the protective door downward, the connection belt pulls the connection rod to rotate toward the gas spring, driving the piston rod of the gas spring to gradually retract inward.

18. A machine, comprising:
a protective shroud including a shroud body, a protective door movably installed on the shroud body, and a buffer mechanism connected between the shroud body and the protective door, the buffer mechanism slowing down a moving speed of the protective door, the protective door is moved between an open position and a closed position in a vertical direction to open or close the shroud body, the buffer mechanism includes a connection rod and a connection belt, an end of the connection rod is rotationally connected to the shroud body, a pair of ends of the connection belt are respectively connected to the shroud body and the protective door; and
an electric device or a moving part contained in the protective shroud.

19. The machine of claim 18, further comprising a human-computer interaction device slidably connected to a top of a front side of the shroud body of the protective shroud, the human-computer interaction device is capable of being moved left and right in a width direction of the protective door, so that it is capable of being moved to a position that does not interfere with an operator access to the protective shroud.

20. The machine of claim 19, wherein the human-computer interaction device has an L-shaped connection arm, an end of the L-shaped connection arm is slidably connected to the top of the front side of the shroud body, the human-computer interaction device is suspended in front of the protective door to not interfere with opening and closing of the protective door.

* * * * *